May 11, 1965   J. T. FISHER   3,182,709
CONTROLLED FUEL LIMITER
Filed April 8, 1963

INVENTOR.
JOHN T. FISHER
BY
*Edward A. Sokolski*
ATTORNEY

United States Patent Office 3,182,709
Patented May 11, 1965

3,182,709
CONTROLLED FUEL LIMITER
John T. Fisher, 6325 W. 85th Place,
Los Angeles 45, Calif.
Filed Apr. 8, 1963, Ser. No. 271,132
7 Claims. (Cl. 158—36.3)

This invention relates to a controlled fuel limiter and more particularly to such a device in which the available fuel supply to an engine can be selectively limited to a predetermined quantity.

The use of a vehicle such as an automobile is generally controlled by an ignition key. There are many instances, however, where it is necessary that control of the ignition system be provided so that only limited utilization of the vehicle is afforded as for example, when lending vehicles for a short trip or in leaving an automobile in a parking lot. In the latter instance, the parking lot operator generally requires that the key be left in the car so that the attendant can move the vehicle as necessary. There is no way, however to limit such utilization to the intended purpose. Leaving the keys in parked vehicles leads to many thefts, which could otherwise be avoided.

It is therefore an object of this invention to permit limited utilization of a vehicle such as an automobile as would be required in a parking lot, but cutting off such utilization by providing only a predetermined limited fuel supply.

It is a further object of this invention to lessen the hazard of automobiles being stolen while in parking lots.

It is a further object of this invention to provide a device which is controlled by security or secret means which will provide a predetermined amount of fuel to an engine and then cut off all fuel supply thereto.

It is still another object of this invention to provide a simple but highly effective device for selectively limiting the operation of an engine.

Figure 1:
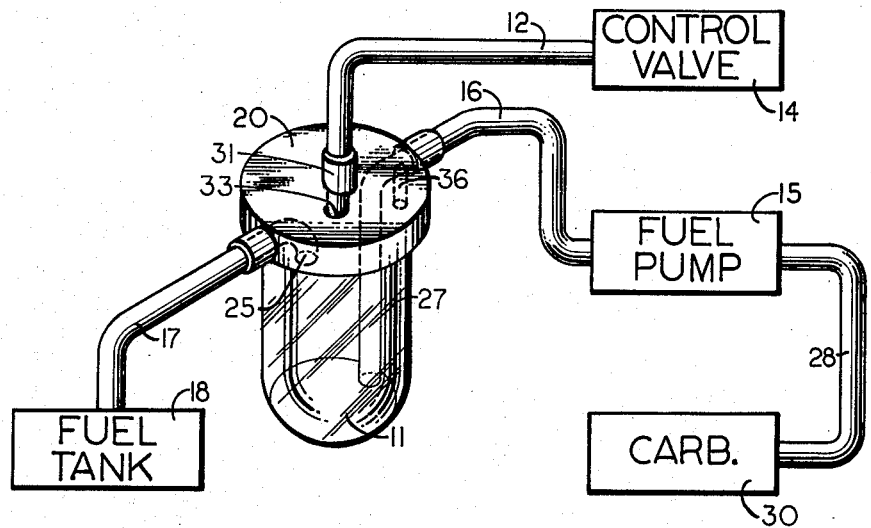
Figure 2:
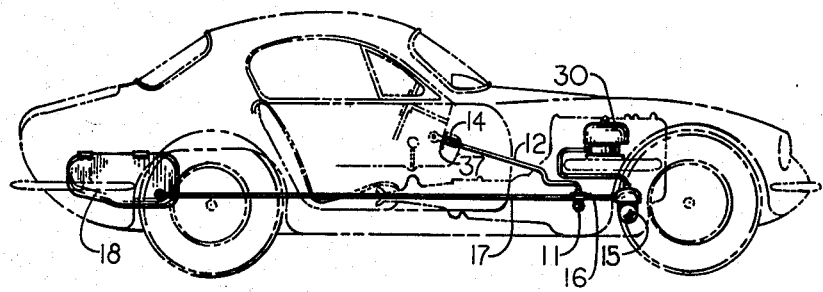

Other objects of this invention will become apparent from the following description taken in connection with the accompanying drawings of which, FIG. 1 is schematic diagram of a preferred embodiment of the device of the invention, and FIG. 2 is a diagram illustrating a typical installation of the device of the invention in an automobile.

In the device of the invention the fuel supply is controllably limited by interposing a container between the fuel tank and the fuel pump. In normal operation of the vehicle, this container is maintained substantially airtight. The fuel from the fuel tank enters therein and is pumped therefrom by the fuel pump, which is of the conventional vacuum type, the container normally remaining filled with fuel. When it is desired to limit the fuel supply available to the engine to the fuel held in the container, a control valve which is connected to the inside of the container is opened to allow air to enter therein, thereby breaking the vacuum in the container which has been utilized to draw fuel from the fuel tank. The input line from the fuel pump to the container being at the bottom of the container, the fuel pump will then draw whatever fuel remains in the container and when this is gone, no further fuel will be available for the engine. Thus, the available fuel supply to the engine is limited to that available in the container, and operation of the vehicle is controlled.

Referring now to FIG. 1 a preferred embodiment of the device of the invention is illustrated. Fuel tank 18 is connected to inlet line 25 by means of connecting line 17. Inlet line 25 runs through cover plate 20 to the inside of container 11. Cover plate 20 is attached to the top of container 11 in airtight relationship therewith. Such an airtight seal may be achieved by means of a sealing gasket, having the cover plate soldered directly thereto, or other techniques well known in the art. Outlet line 27 runs from the bottom of container 11 through cover plate 20 and terminates at the exterior of the cover plate in a connection with outlet line 16. Outlet line 16 runs to fuel pump 15 which in turn pumps the fuel via line 28 to carburetor 30.

Cover plate 20 has an aperture 33 in the top thereof which runs completely through the cover plate. A fitting 31 is utilized to make an airtight connection to line 12 and to the cover plate at the aperture. Line 12 runs to control valve 14. In normal operation of the vehicle, control valve 14 is closed, fuel pump 15 draws fuel from container 11, and by virtue of the vacuum established thereby draws fuel into the container from fuel tank 18 to maintain the fuel level near the top of the container at all times. Bleeder hole 36 connects the top of line 27 to the top of the container. This hole enables the scavenging of air from the top of the container by the pumping action to evacuate the air from above the level of the fuel thereby assuring suction for drawing fuel to the container from the fuel tank. When it is desired that the available fuel supply be limited to that contained in container 11 at any instant, control valve 14 is opened allowing air to pass into container 11. This breaks the vacuum in line 17 to fuel tank 18, thereby effectively cutting off further fuel supply from the fuel tank. The fuel pump will therefore draw all of the fuel remaining in container 11 and when this fuel has been used up, no further fuel supply will be available.

Thus, the vehicle can be operated only as long as the fuel supply in container 11 lasts. When it is desired to restore the vehicle to normal operation, valve 14 is closed and the vacuum to the fuel tank is reestablished by the pumping action of the fuel pump, air in the top of the container being pumped out through bleeder hole 36. With such normal operation, container 11 is immediately refilled.

For proper operation it is essential that the container be completely sealed except when control valve 14 is opened. The various connecting fittings and entrance lines to the container must therefore be maintained airtight. Container 11 and cover 20 may be of any suitable material commensurate with the maintenance of the proper seal. It is contemplated that the operation of control valve 14 will be in conjunction with security means such as a key. Control valve 14 could be placed in the driving compartment of the vehicle in any suitable position and would be opened by means of an associated security lock means when limited operation of the vehicle is desired.

It is to be noted that such limited operation might be utilized for other purposes than for parking an automobile in a parking lot. It might also be useful where a car is loaned and it is desired that utilization be limited to a particular trip. The amount of operation available can be varied by changing the size of the container 11 which is utilized.

Referring now to FIG. 2 a typical installation of the device of the invention in an automobile is illustrated. As can be seen, container 11 is suitably mounted on the vehicle in the engine compartment thereof, and is suitably connected by line 16 to fuel pump 15 and by line 17 to fuel tank 18. The top of the container is connected by means of line 12 to control valve 14 which is actuated by means of lock 37. Lock 37 is mounted on the automobile dashboard and can only be controlled by means of a special key. The operator when parking his vehicle would leave his ignition key therewith and would utilize the key for controlling lock 37 to open the control valve, thereby limiting the fuel supply of the engine to that in container 11.

Thus it can be seen the device of the invention provides simple but effective means for limiting the supply of fuel to a vehicle engine with security control over such limiting. No special means are required to fill container 11 as it remains filled with normal operation of the vehicle. Thus, the predetermined limited fuel supply, i.e. the amount of fuel which fills container 11 is always available after the vehicle has been utilized with control valve 14 closed even for only a few moments. The device of the invention thus provides a simple but highly effective means for discouraging the theft of automobiles parked with the ignition keys therein. The fuel supply of container 11 can be limited so that the vehicle could travel only for a short distance so that it can readily be found within a short radius of the point from where it was taken. While the invention has been described in connection with an automobile, it can be used to equal advantage as means for controllably limiting the use of any engine driven mechanism.

While the device of the invention has been described and illustrated in detail it is to be clearly understood that this is by way of illustration and example only and is not intended by way of limitation, the spirit and scope of the invention being limited only by the terms of the following claims.

I claim:

1. In an engine fuel system, said engine being supplied fuel from a fuel tank by the pumping action of a vacuum pump, means for selectively limiting the available fuel supply to the engine to a predetermined amount comprising
    a substantially airtight container,
    means for connecting said container to said fuel tank,
    means for continually connecting the top of said container to said vacuum pump to provide for the scavenging of air from said container,
    means for continually connecting the bottom of said container to said vacuum pump, and
    valve means connected to said container for selectively permitting air to enter said container,
    whereby when air is permitted to enter said container, said pump pumps only the fuel supply remaining in said container to said engine.

2. The system as recited in claim 1 and additionally including lock means connected to control the air flow through said valve means.

3. The system as recited in claim 1 wherein said means for connecting said container to said fuel tank comprises a line running to said container and said means for connecting the bottom of said container to said pump comprises a line running to the bottom of said container.

4. The system as recited in claim 3 wherein said line running to the bottom of said container has a bleeder hole therein connecting the line to the top of said container, said means for connecting the top of said container to said pump comprising said bleeder hole.

5. In a fuel supply system for an engine,
    a fuel tank,
    a substantially airtight container,
    a first line running between said fuel tank and said container,
    a fuel pump,
    a second line running between said pump and the engine,
    a third line running between said pump and the bottom of said container, said third line having a bleeder hole therein connecting said third line to the top of said container for permitting said pump to scavenge air from the top of said container,
    a fourth line,
    control valve means for selectively opening said container to the atmosphere, said control valve means being connected to the top of said container by said fourth line, and
    lock means for controlling the passage of air through said control valve means.

6. A system for controllably limiting the fuel supply to an automobile engine comprising
    a fuel tank,
    a fuel pump connected to said engine,
    a substantially airtight container,
    a line connecting said fuel tank to said container,
    a line connecting said fuel pump to the bottom of said container,
    bleeder means for connecting the top of said container to said line connecting said fuel pump to the bottom of said container to permit said fuel pump to scavenge air from said container,
    a control valve mounted in the driver compartment of said vehicle,
    a line connecting said control valve to the top of said container
    said control valve being adapted to permit air to enter said container in one position thereof and to shut off air from said container in another position thereof, and
    lock means for selectively controlling the position of said valve.

7. In a controlled fuel limiter for selectively limiting the fuel supply to an engine to a predetermined quantity comprising
    a fuel tank,
    a fuel pump connected to said engine,
    means for interconnecting said fuel tank and said fuel pump including a substantially airtight container, a first line running from said fuel tank to said container, a second line running from said fuel pump to the bottom of said container, and bleeder means for connecting said second line to the top of said container to permit the scavenging of air from said container, and
    control means for selectively permitting air to enter said container,
    whereby when air is permitted to enter said container, fuel cannot be drawn from said fuel tank into said container, and when the air supply to said container is shut off, said fuel pump draws the air from the top of said container, and fuel is drawn from said fuel tank to fill said container.

References Cited by the Examiner
UNITED STATES PATENTS

| | | | |
|---|---|---|---|
| 1,105,272 | 7/14 | Hollar | 158—46.5 |
| 1,409,845 | 3/22 | Goodwin. | |
| 1,477,317 | 12/23 | Cornick. | |
| 1,570,010 | 1/26 | Scowcroft | 158—46.5 |

JAMES W. WESTHAVER, *Primary Examiner.*
FREDERICK KETTERER, *Examiner.*